US012771678B2

(12) United States Patent
Rathore

(10) Patent No.: US 12,771,678 B2
(45) Date of Patent: Oct. 20, 2026

(54) IDENTIFYING PROVENANCE OF AUTHENTIC MEDIA

(71) Applicant: Awake Market, Inc., San Mateo, CA (US)

(72) Inventor: Amit Rathore, San Mateo, CA (US)

(73) Assignee: Awake Market, Inc., San Mateo, CA (US)

( * ) Notice: Subject to any disclaimer, the term of this patent is extended or adjusted under 35 U.S.C. 154(b) by 0 days.

(21) Appl. No.: 18/759,227

(22) Filed: Jun. 28, 2024

(65) Prior Publication Data

US 2024/0356906 A1 Oct. 24, 2024

Related U.S. Application Data

(63) Continuation-in-part of application No. 17/362,983, filed on Jun. 29, 2021, now Pat. No. 12,118,528.

(60) Provisional application No. 63/034,168, filed on Jun. 3, 2020.

(51) Int. Cl.
*H04L 9/40* (2022.01)
*G06F 21/51* (2013.01)

(52) U.S. Cl.
CPC .............. *H04L 63/08* (2013.01); *G06F 21/51* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 9,713,444 | B2 | 7/2017 | Severson | |
| 2003/0079141 | A1 * | 4/2003 | Eitel | H04L 63/08 713/194 |
| 2007/0038931 | A1 * | 2/2007 | Allaire | G06Q 30/0601 715/208 |
| 2009/0328207 | A1 * | 12/2009 | Patel | G06F 21/10 726/22 |
| 2010/0325247 | A1 * | 12/2010 | Levkowetz | H04W 8/26 709/220 |
| 2014/0025478 | A1 | 1/2014 | Mischuk et al. | |
| 2015/0317643 | A1 * | 11/2015 | Mian | G06F 21/645 705/317 |
| 2017/0262862 | A1 | 9/2017 | Aljawhari | |
| 2017/0272249 | A1 * | 9/2017 | Bhandarkar | H04L 9/3247 |
| 2024/0113940 | A1 | 4/2024 | Buck et al. | |

OTHER PUBLICATIONS

International Search Report and Written Opinion of the International Search Authority in international application No. PCT/US2025/035972, mailed on Nov. 4, 2025.
First Examination Report received in counterpart Australian application No. 2021282739, received on Jun. 11, 2026.

* cited by examiner

*Primary Examiner* — Raqiul A Choudhury
(74) *Attorney, Agent, or Firm* — Cognition IP, P.C.; Edward Steakley; Rajesh Fotedar

(57) ABSTRACT

An authenticity software platform receives an indication of an external web action and determines a first provenance for a first external web location at which the web action occurs. The authenticity software platform determines a second provenance for an external result occurring in response to the web action. The authenticity software platform determines an extant of trust based at least in part on the first and the second provenance for the result.

19 Claims, 6 Drawing Sheets

IDENTIFYING PROVENANCE OF AUTHENTIC MEDIA

CROSS-REFERENCE TO RELATED APPLICATIONS

This application a continuation-in-part of U.S. application Ser. No. 17/362,983 filed Jun. 29, 2021, which is hereby incorporated by reference in its entirety.

This application claims the benefit of U.S. Provisional Application No. 63/034,168, filed Jun. 3, 2020, which is hereby incorporated by reference in its entirety.

FIELD OF INVENTION

Various embodiments relate generally to authenticating a source of web-based resources and end users.

SUMMARY

The appended claims may serve as a summary of one or more embodiments of an Authenticity Platform. Various embodiments of the Authenticity Platform (or authenticity software platform) described herein provide improvements to conventional systems for authentication of web locations, content and end users. The Authenticity Platform receives an indication of an external web action and determines a first provenance for a first external web location at which the web action occurs. The Authenticity Platform determines a second provenance for an external result occurring in response to the web action. The Authenticity Platform determines an extant of trust based at least in part on the first and the second provenance for the result. According to various embodiments, prior to the external result actually occurring, the Authenticity Platform generates and transmits message data based on the determined extant of trust. The message data may be suitable for display of the extant of trust at the first external web location. For example, if the external result comprises accessing (i.e. resolving to) another external web location (i.e. a different website), the message data communicates the trustworthiness of a source of that other external web location.

The Authenticity Platform provides for authentication of a context in which an action or activity occurs external to the Authenticity Platform. If an end user performs a certain action at a website external to the Authenticity Platform, the Authenticity Platform verifies the provenance of web resources involved or implicated in the end user's action. The Authenticity Platform may verify a provenance of the website at which the certain actions occur. The Authenticity Platform may verify a provenance of web content consumed by the end user's actions. The Authenticity Platform may further verify a provenance of a result of the end user's actions. By determining whether a provenance of any of the website(s), web content and the result(s) can be verified, the Authenticity Platform indicates an extant of trustworthiness of the context in which the end user is performing those actions.

In various embodiments, the Authenticity Platform, stores, generates and maintains data and identifiers associated with predefined relationships amongst one or more web locations, entities and/or end users that engage in various web-based actions and web-based activities external to the Authenticity Platform. Such relationships may be one or more trust relationships defined by the Authenticity Platform and include verified web locations, entities and end users as affiliates that have opted into a defined and trusted partnership/membership within an Authentic Network of the Authenticity Platform. The Authenticity Platform may generate, store, manage and distribute various encodings and identifiers indicating a provenance as being any one of the affiliates.

According to various embodiments, the Authenticity Platform may be associated with (and/or implement, manage) one or more Authentic Networks. Each Authentic Network includes web locations, entities and end users participating as affiliates of one another according to a particular determined and acknowledged partnership/membership which may be managed by a central data store, database and/or server. The Authenticity Platform may generate an Anonymized Membership ID (AMID) for one or more of the affiliates and trigger insertion of the AMID into one or more URLs (or customized URLs) shared or hosted by any one of the affiliates. It is understood that the Authenticity Platform may be associated with multiple separate or interconnected Authentic Networks. Each respective Authentic Network may be associated with a Network ID formatted by the Authenticity Platform. A Network ID may be encoded into a portion(s) of an AMID.

The Authenticity Platform tracks and/or detects the web-based actions and web-based activities of the one or more affiliates. The Authenticity Platform further tracks and/or detects actions and activities at external web locations, with external web content and/or in software modules (such as software applications) hosted by or provided by the one or more affiliates.

The Authenticity Platform determines whether one or more affiliates correspond to the tracked or detected actions and activities and can trigger display of authentication messages external to the Authenticity Platform. For example, triggering display of an authentication message may be based on the Authenticity Platform verifying that a detected action(s) of a first affiliate is occurring with respect to a previous action(s) of a second affiliate or that the detection action(s) is occurring at a web location of the second affiliate. For example, the Authenticity Platform may verify an occurrence of the first affiliate selecting a customized URL that was previously posted on a third-party social network platform by a second affiliate. In another example, the Authenticity Platform may verify an occurrence of the first affiliate selecting a customized URL that provides access to a web location (such as a website) of an affiliate—although the Authenticity Platform may not be able to verify a provenance (i.e., a source) of the customized URL posted on the third-party social network platform which was selected by the first affiliate.

According to various embodiments, a Knowledge Mechanism may be stored by, stored at, executed and/or provided by the Authenticity Platform. The Knowledge Mechanism may represent a provenance of a web location, web content or a software module external to the Authenticity Platform. The Knowledge Mechanism may indicate a provenance as originating from an affiliate that participates in a respective partnership/membership of a particular Authentic Network of the Authenticity Platform.

In one or more embodiments, the Authenticity Platform may trigger insertion and/or display of a Knowledge Mechanism at a website or a software application of a first affiliate. For example, the Knowledge Mechanism may be a slim banner graphic triggered for display at the first affiliate's participating external website or software application as a second affiliate accesses or sends requests to the first affiliate's participating external website or software application. The Authenticity Platform may trigger display of the Knowledge Mechanism at a computing device or a mobile device associated with the second affiliate. The slim banner graphic may provide a visual cue to the second affiliate that the external website or software application has a provenance verified as being that of the first affiliate. In the alternative, if the Authenticity Platform is unable to determine or verify a provenance of the external website or software application, the Authenticity Platform may trigger display of a different type of authentication message providing a visual cue to the second affiliate that the external website or software application currently accessed by the second affiliate has an unverified provenance.

Various embodiments include a module(s) and/or one or more functionalities to redact privacy information/data, to encrypt information/data and to anonymize data to ensure the confidentiality and security of user and platform information/data as well as compliance with data privacy law(s) and regulations in the United States and/or international jurisdictions.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present invention relates generally to shared authentic media and maintaining provenance data to confirm the authenticity of the shared media data.

The present disclosure will become better understood from the detailed description and the drawings, wherein.

DETAILED DESCRIPTION

Figure 1A:
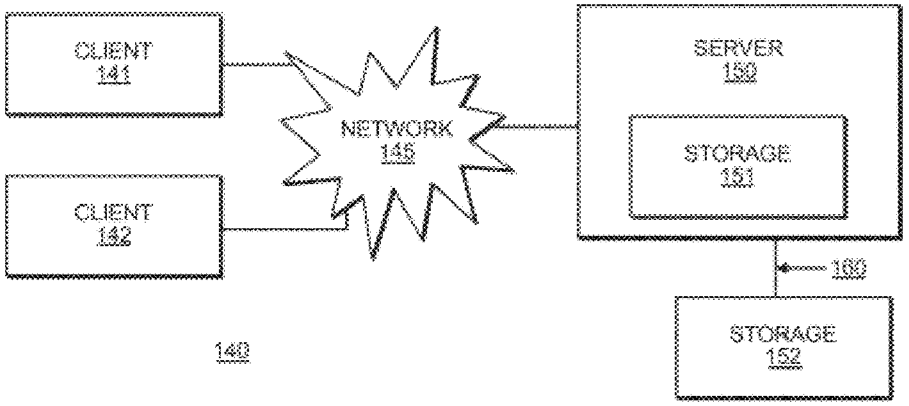
FIG. 1A illustrates an example network configuration according to example embodiments.

It will be readily understood that the instant components, as generally described and illustrated in the figures herein, may be arranged and designed in a wide variety of different configurations. Thus, the following detailed description of the embodiments of at least one of a method, apparatus, computer readable storage medium and system, as represented in the attached figures, is not intended to limit the scope of the application as claimed but is merely representative of selected embodiments. Multiple embodiments depicted herein are not intended to limit the scope of the solution. The computer-readable storage medium may be a non-transitory computer readable media or a non-transitory computer readable storage medium.

The instant features, structures, or characteristics described in this specification may be combined in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one example. Thus, appearances of the phrases "example embodiments", "in some embodiments", "in other embodiments," or other similar language, throughout this specification can all refer to the same embodiment. Thus, these embodiments may work in conjunction with any of the other embodiments, may not be functionally separate, and the described features, structures, or characteristics may be combined in any suitable manner in one or more embodiments.

Example embodiments provide methods, systems, hardware components, non-transitory computer readable media, devices, and/or networks, which provide for provenance and authentication of web access operations.

In various embodiments, an authenticity software platform defines a trust relationship between a plurality of different affiliate entities. The authenticity software platform tracks external web activity associated with a first user account that corresponds to a first affiliate entity in the trust relationship, the first user account for accessing the authenticity software platform.

The authenticity software platform receives an indication of an external web action performed the first user account and determines a first provenance of an external web location at which the external web action occurs.

The authenticity software platform determines the first provenance corresponds to at least one of the affiliate entities.

The authenticity software platform determines an extant of trust based at least in part on the first provenance for a result occurring in response to the external web action performed the first user account.

In one embodiment, when a website is accessed by an end user device, such as a mobile device (e.g., computer, smartphone, etc.), the link corresponding to the website that was accessed and selected by the mobile device may be posted by another entity on a particular webpage, such as a forum (e.g., FACEBOOK, REDDIT, TWITTER ('X'), etc.). The link may be accessed directly by the mobile device, however, browsing information and selecting links to websites for consumer products is becoming increasingly popular given the current structure of Internet usage and corresponding current mobile device usage statistics.

Authenticity of a selected link operation may be determined when all known participating entities which contributed to the selected link (i.e., one or more entities that created the link, copied the link, posted the link, the location of the link being posted, and an entity that selected the link are identifiable. When one entity identifier or piece of information is missing or is unknown from the data associated with the URL (uniform resource locator), then the access operation to reach the website is not fully authenticated. The more authenticated the link access process becomes the more recognizable the sources become and the more reliable the information becomes and the greater the likelihood that security of the end user mobile device will not be compromised.

Tracking provenance of the web access information over the Internet provides a way to determine how a particular device and/or profile can lead to a particular website XYZ.com. In this example the term 'XYZ.com' website may be a product website, such as a website for GUCCI, or NIKE or some other popular website that is always welcoming users and members to its platform to browse and purchase products. It may be common for a user device (e.g., mobile device) to access a particular website (XYZ.com) through another web location on the Internet, such as a blog, a social media platform (ABC.com), etc. Examples of websites where links for accessing external product websites are often posted by other end users are FACEBOOK and TWITTER ('X'), etc. REDDIT is an example of a third-party website where such links may be easily posted and shared. Other sites, such as FACEBOOK, often create proprietary URLs that are specific to the FACEBOOK platform itself and which will generally not preserve any provenance data since all previous link information contained in an original link shared by an end user is wiped clean during a reformatting process.

Internet advertising, by default, establishes an advertisement on a particular website for another website. The website location that is hosting the advertisement may have established partnerships with the particular website of interest or may be unrelated to the web location where the link was posted and accessed by a user device at a later time. A knowledge management device, such as server or software module could be implemented as an API or other web-based tool, such as a slim banner or other data source of information. One example approach to establishing provenance data may be URL links customized with source information of all known entities being created and posted on social media sites being shared by a particular device, which may be a registered member affiliate of the web destination or a non-registered member. If the website hosting the link, is a member of the web location identified in the link, then there may be an established partnership between the two websites stored in a memory. Or, alternatively, the hosting website location may not be registered and thus may be a non-registered member of the web location.

FIG. 1A illustrates an example network configuration according to example embodiments. Referring to FIG. 1A, the exemplary environment 140 includes two clients 141, 142 which are connected over a network 145 to a server 150 having local storage 151. Clients and servers in this environment may be computers. Server 150 may be configured to handle requests from clients.

The exemplary environment 140 is illustrated with only two clients and one server for simplicity, though in practice there may be more or fewer clients and servers. The computers have been termed clients and servers, though clients can also play the role of servers and servers can also play the role of clients. In some embodiments, the clients 141, 142 may communicate with each other as well as the servers. Also, the server 150 may communicate with other servers.

The network 145 may be, for example, local area network (LAN), wide area network (WAN), telephone networks, wireless networks, intranets, the Internet, or combinations of networks. The server 150 may be connected to storage 152 over a connection medium 160, which may be a bus, crossbar, network, or other interconnect. Storage 152 may be implemented as a network of multiple storage devices, though it is illustrated as a single entity. Storage 152 may be a file system, disk, database, or other storage.

Figure 3:
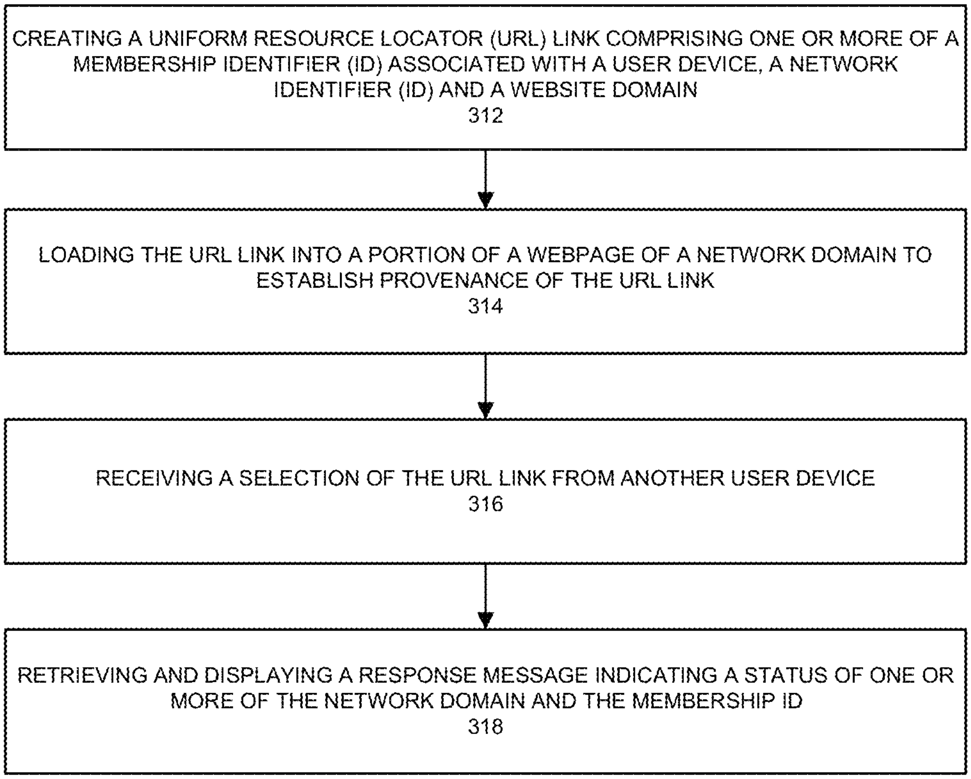
FIG. 3 illustrates an example process of performing an authenticated link creation and access operation according to example embodiments.

In an embodiment, the client 141 may perform a method such as the example of FIG. 3 or another method herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151. In another embodiment, the server 150 may respond to requests and store the file with a specified name in the storage 151. The file to be saved may exist on the client 141 or may exist in other storage accessible via the network such as storage 152, or even in storage on the client 142 (e.g., in a peer-to-peer system).

In accordance with the above discussion, embodiments can be used to store a file on local storage such as a disk or on a removable medium like a flash drive, CD-R, or DVD-R. Furthermore, embodiments may be used to store a file on an external storage device connected to a computer over a connection medium such as a bus, crossbar, network, or other interconnect. In addition, embodiments can be used to store a file on a remote server or on a storage device accessible to the remote server.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

Figure 1B:
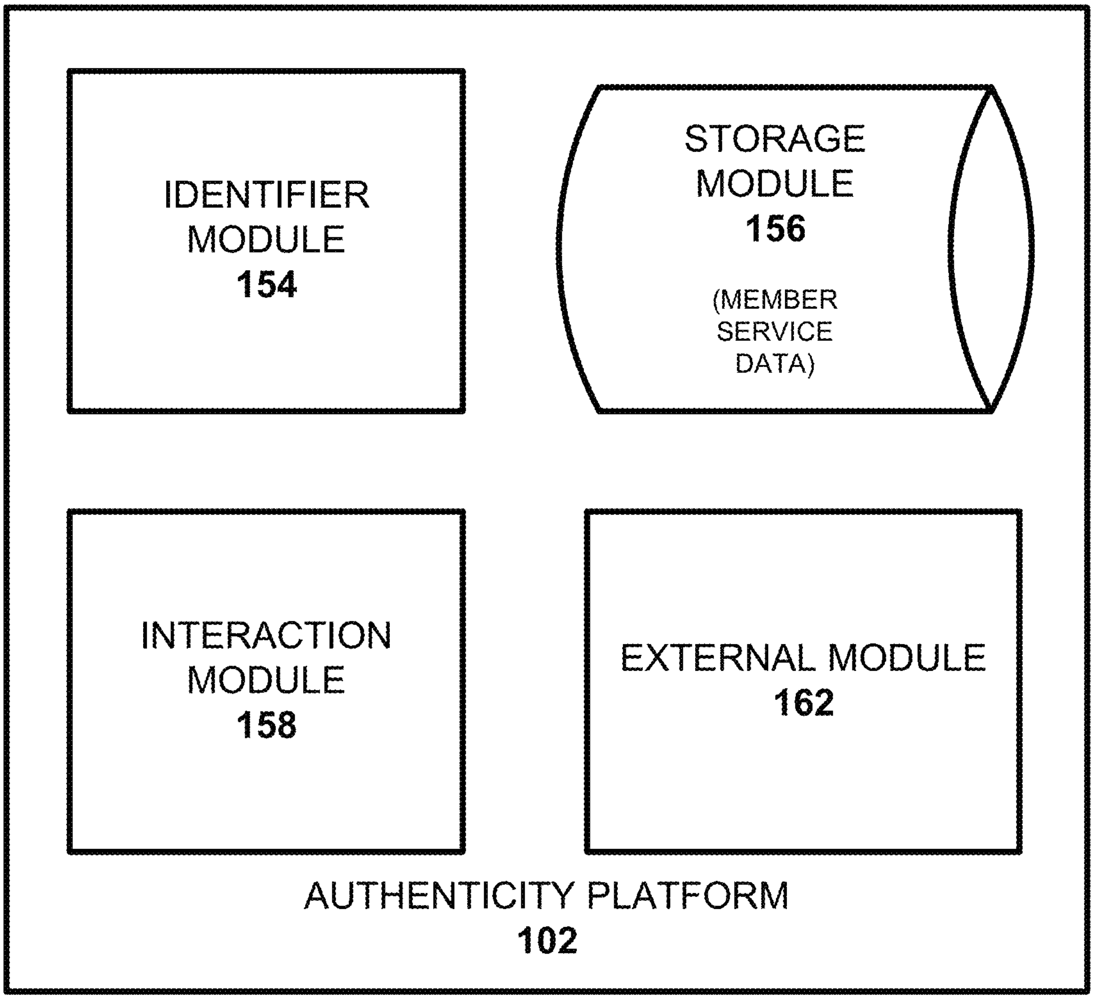
FIG. 1B is a computer processing platform configured to perform authenticity management according to example embodiments.

FIG. 1B is a diagram illustrating exemplary software modules 154, 156, 158, 162 that may execute some or all of the functionality described herein. According to some embodiments, one or more of exemplary software modules 154, 156, 158, 162 may be components of the Authenticity Platform 102. It is understood that various embodiments of the Authenticity Platform 102 may implement, execute, trigger, instantiate and/or complete any, all or respective portions of the operations, steps or instructions described herein. The Authenticity Platform 102 may detect activity external to it. According to an example, such detection may include receipt of a message or data indicating an occurrence of a particular type of event or state change at a location external to the Authenticity Platform 102.

Identifier module 154 functions to define, support, execute, and/or implement any of the functionalities, acts and/or operations described herein with regard to generating, encoding and decoding digital media identifiers, URLs and other web based data structures.

Storage module 156 functions to define, support, execute, and/or implement any of the functionalities, acts and/or operations described herein with storing data, such as—for example—reading and writing to a persistent ledger, storing provenance data, updating provenance data, storing and managing a product catalog(s) and/or storing and managing business rules and/or payment rules and member service data identifying the profiles and other information used to identify which entities are members and those which may be readily identified from the URL link information attached to the URL which is customized for each member of a fully authenticated URL.

Interaction module 158 functions to define, support, execute, and/or implement any of the functionalities, acts and/or operations described herein with regard to interactions and/or events.

External module 162 functions to define, support, execute, and/or implement any of the functionalities, acts and/or operations described herein with regard to an external authentication engine. The external module 162 may be a separate module that communicates with the Authenticity Platform 102.

The above modules 154, 156, 158, 162 and their functions will be described herein in further detail in relation to FIGS. 2-4. It is understood that the functions of modules 154, 156, 158, 162 may considered as functions of the Authenticity Platform 102 in whole or in part.

In some embodiments, the Authenticity Platform 102 may be part of an attribution software platform. Operations, methods, instructions and steps described as being implemented and performed by the attribution software platform may be understood as operations, methods, instructions and steps of Authenticity Platform 102.

Upon logging in, a user account(s), for accessing the attribution software platform, associated with a vendor that has opted in to selling one or more products on the attribution platform further accesses functionality of a product catalog importer in order to seamlessly import product data from one or more product and service catalogs from one or more e-commerce engines onto the attribution platform. In various embodiments, a user account(s) associated with a vendor may manually create one or more product catalogs to be accessible on the attribution platform. When product data is accessible on the attribution platform, respective user accounts can browse one or more product catalogs and select various portions of product data to be published on remote social platforms and/or various remote digital media channels.

In various embodiments, a product data for a product(s) listed in a product catalog(s) may be associated with a unique tracking code embedded within a digital media identifier to enable tracking of any interaction with a potential customer and/or attribution platform user account and recording of events, interactions, data, sources related to one or more publications of various digital media identifiers related to product data on a persistent ledger.

Various embodiments described herein provide functionality to acquire real—time data on every interaction with a digital media identifier generated by the attribution software platform published at various web locations external to the attribution software platform. Various embodiments provide functionality for tracking a product's informational activity as respective digital media identifiers related to the product flow through multiple digital and social media channels, situated remotely from the attribution platform, up to a point of sale for an instance of a product described by product data provided by the respective digital media identifiers. For example, a digital media identifier may be a unique resource locator (URL). In various embodiments, the attribution platform generates one or more tracking codes that are embedded into a product URL via product link generator that communicates with a system backend module(s).

Various embodiments described herein provide functionality to attribute and/or apply a particular network fee structure that corresponds with a purchased product in order to determine transaction allocations that are to be dispersed to one or more attribution platform user accounts identified in provenance data associated with the product's traced informational activity.

The attribution software platform includes one or more system backend module(s) linked with one or more product catalogs and various respective services that may be called by the attribution software platform in order to generate a unique digital media identifier. As an example, a unique URL link. In various embodiments, for each product SKU identifier that has been imported via a product import engine onto the attribution software platform, one or more of the system backend module(s), the attribution software platform generates a unique digital media identifier used to track external interactions with a published instance of the digital media identifier and to store tracked information into a database. For example, a database may be a persistent ledger.

In various embodiments, a digital media identifier(s) for a particular product can be published on any social/digital media platform for tracking and decoding. A digital media identifier(s) may be tracked in order to determine the influence of one or more attribution platform user accounts have on a sale journey that ultimately result in a purchase of an instance of that particular product. A digital media identifier (s) may be decoded according to a node decoder and a protocol converter in order to identify the provenance of various interactions and events along the sale journey.

Various embodiments described herein further provide functionality for generating graphics based on an extant of trust for a context of a web action or web activity that consumes or involves a published digital media identifier(s). A data storage service engine captures various types of data associated with interactions with digital media identifiers. It is understood that the data storage service engine may capture data from any number of interactions and/or events triggered across a multitude of remote and disparate software platforms and/or computer networks.

The node decoder provides for attribution functionality and accesses the data captured by the data storage service engine and decodes the accessed data to identify (i.e. detect, surface, harvest, infer) one or more relationships represented in the captured data in order to identify a trust relationship associated with the digital media identifier. The node decoder connects a messaging system with a rules engine to decode and connect various data points triggered by every or any interaction and/or event.

Accordingly, the attribution platform captures data involved in an entire chain of interactions and/or events related to respective digital media identifiers that may be published across different remote (external) social and/or digital media software platforms. The attribution platform determines relationships between user accounts associated with the respective digital media identifiers and the respective interactions and/or events in order to determining an extant of trust of a result(s) of such track interactions.

It is understood that any kind of data described herein may be stored in the persistent ledger whereby the persistent ledger maintains data and records that correspond to one or more transactions between any two nodes identified by the node decoder.

Figure 2A:
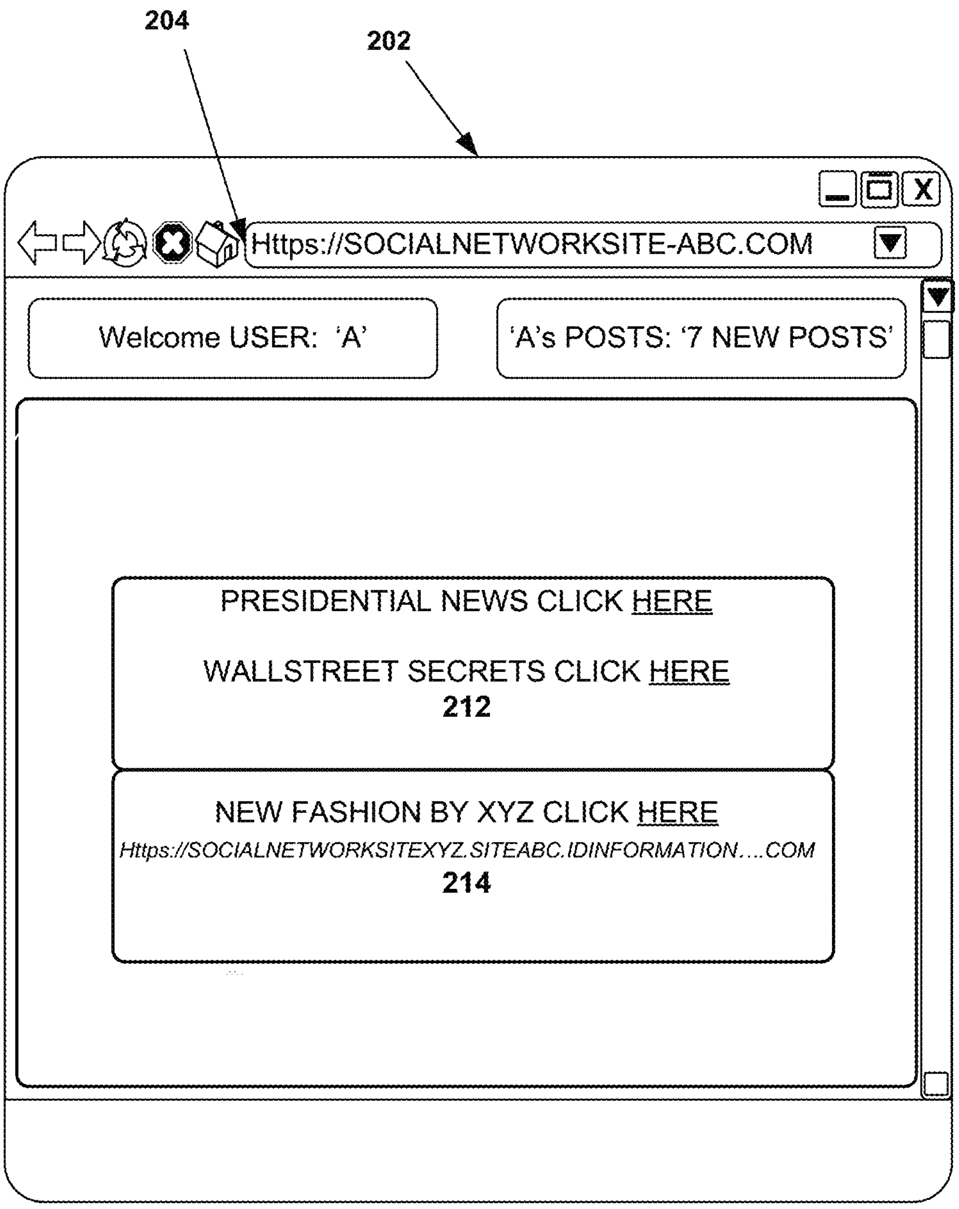
FIG. 2A illustrates a webpage including customized links provided by potential affiliate entities according to example embodiments.

FIG. 2A illustrates a webpage including customized links provided by potential affiliate entities according to example embodiments. Referring to FIG. 2A, the entity that posted the link may also play a role in the authenticity of the posted URL link. The user device may be a registered entity with a user profile that is known to the partner network of the web address. The website may be a browser-based website 202 with a URL that corresponds to a webpage 204 provided by a particular social network 'ABC.com' for example purposes. A user entity may be logged into the social network website 'ABC.com' as user 'A' and may have corresponding user information associated with the user's profile. A first post 212 and a second post 214 may be included on a webpage 204 accessible via the website 202. The first post 212 may provide access to web content that is external to the ABC.com website 202. The second post 214 may be shared by user 'A' as a customized URL (https://socialnetworksitexyz.site.ID . . . ) that includes an identifier of the webpage 204 and an identifier of the user profile for user 'A' including the AMID assuming the user profile and/or the website 'ABC.com' are affiliates of 'XYZ.com'. The URL will also contain a web address that resolves to a particular external website as a final destination, such as 'XYZ.com'.

If the final destination website 'XYZ.com' has a membership arrangement with the hosting website 'ABC.com', a message may be used to demonstrate a current status of the partnership/membership. In one example, upon detection by the Authenticity Platform 102 that the customized link is inserted via the second post 214 into the 'ABC.com' site, a display of a welcome message at the ABC.com website may be triggered by the Authenticity Platform 102.

The welcome message may include content that identifies one or more of the member entities participating in the partnership/membership. For example, upon detection of the customized link of the second post 214, display of the welcome message be triggered to show: "Hello, ABC.com is a registered member of our network, welcome!".

In addition, upon detection by the Authenticity Platform 102 of an interaction with the customized URL, such as another end user of ABC.com selecting the customized URL, an identifier(s) included in a portion(s) of the customized URL may be queried to identify which entity (such as the other end user) that clicked on the customized URL.

It is understood that one or more types of interaction operations may be triggered in response to detection of a corresponding interaction with the customized URL of the second post 214. Such types of exemplary detected interactions include an occurrence(s) of viewing, sharing, saving, commenting on the customized URL and/or including the customized URL in a message that can be sent internally within ABC.com or a message (such as e-mail or text message) sent externally from the ABC.com.

It is further understood that one or more triggered interaction operations may result in output (or return a result) that provides an identification of a source from which the customized URL originated. For example, such a source may be identified as a location associated with ABC.com, an external location associated with an entity participating in the partnership/membership, a source designated as not identifiable or a source designated as not participating in the partnership/membership. One or more triggered interaction operations may further result in a determination of whether the identifier of the user profile for user 'A' is recognized, valid, trusted, active, verified and/or participating in the partnership/membership.

The provenance of the website being loaded may be identified for authenticity. Information about a particular device accessing a website and where the link was existing when the accessing of the link caused a web browser of the user device to load a destination website are all candidates for provenance information. Most social networks, such as FACEBOOK, will strip-out website information associated with a particular URL. Any copied and pasted links used thereafter are established through a proprietary link based off of that particular site. Other sites permit link information sharing without stripping out all web-based information, such as REDDIT. A URL that identifies the member ID of the entity creating the link and the website where the link is posted and the final destination website may provide provenance for a fully authentic website access recognition and authentication process.

Figure 2B:
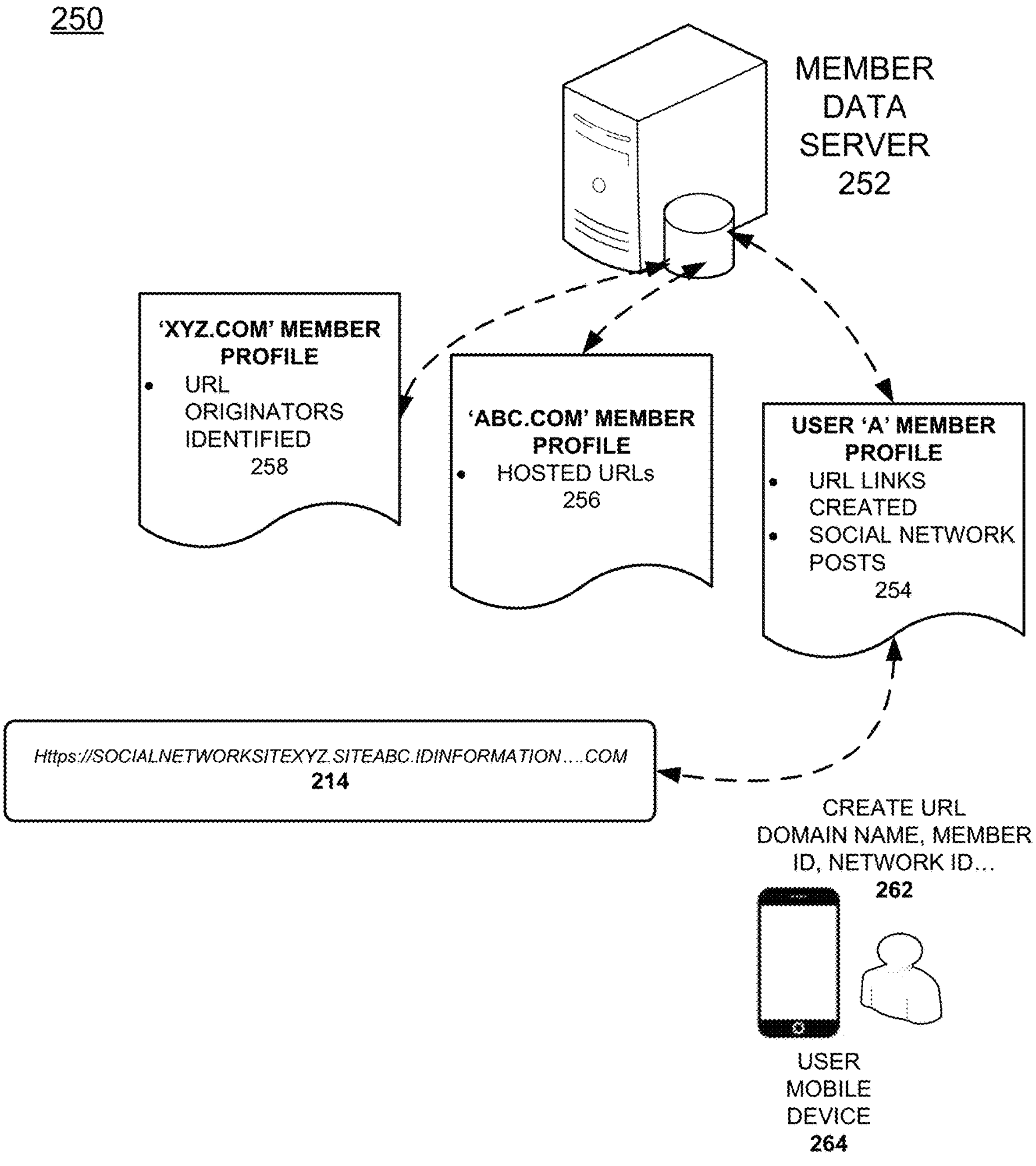
FIG. 2B illustrates a member data server storing member affiliate information used to create customized links according to example embodiments.

FIG. 2B illustrates a member data server storing member affiliate information used to create customized links according to example embodiments. Referring to FIG. 2B, the network configuration 250 may be considered the Authenticity Platform which includes a central database or server 250 responsible for maintaining records of the members registered with a third-party membership service used to establish provenance and create URL links which can be traced back to the creator of those links. Other information maintained by the Authenticity Platform may include the web-based locations where the URL was posted and any entities (devices) which have accessed the link to arrive at the destination website. When a user account and/or device 264 creates a URL and the user is a registered member identified by the server 252, the user profile information 254 may include current and previous URLs created, address locations where the URLs were posted. In the event that the user posted the URL on the website 'ABC.com', the server 252 may recognize the hosting website by its profile 256 assuming that website is a registered member site. Any time a member URL link is posted to the site, a record may be stored in the server as part of the Authenticity Platform indicating the profile 256 has been identified by a URL. Additionally, the destination website 'XYZ'.com may also be a registered member website with a profile 258 stored in memory. When the URLs are accessed by an entity, the URL may identify the user 'A' profile, the hosting website 'ABC.com' and the accessing entity. The URL 214 may be uniquely created by an action taken by the user device 264 when attempting to create and post a URL link that includes the domain name/address, member ID of the creator 254 and a network ID of a website 'ABC.com' 256 where the URL is being posted.

FIG. 3 illustrates an example process of performing an authenticated link creation and access operation according to example embodiments. Referring to FIG. 3, the example method/process may include creating a uniform resource locator (URL) link including a website domain, a membership identifier (ID) associated with a user device and a network identifier (ID) 312. The website domain may be the destination website, the Anonymized Membership ID (AMID) may be for a member device account of the user device used to create the URL and may be a registered member of the destination website and/or a third-party membership service. The Network Identifier (ID) may be the network website where the URL is posted. The process may also include loading the URL link into a portion of a webpage of a network domain to establish provenance of the URL link 314, receiving a selection of the URL link from another user device 316 and retrieving and displaying a response message indicating a status of one or more of the network domain and the membership ID (AMID) 318. As the members identified from the URL are identified, the response message may include a welcome message or an invitation to become a member when the URL does not identify the entities posting and selecting the URL.

The process may also include responsive to determining the selection of the URL link was made on a website domain of a registered member network domain, retrieving and displaying a confirmation message identifying the URL link originated from a registered member network. Alternatively, the process may include responsive to determining the selection was made on a non-registered member network domain, retrieving and displaying a confirmation message identifying the URL link originated from a non-registered member network.

The process may also include identifying the network domain being a non-registered member network domain and providing an option to the user device to join and become a registered member of the member network.

In one example, the process may include identifying a share command associated with the user device, and performing the loading of the URL link into the portion of the webpage of the network domain when the user device is determined to be associated with the registered membership ID and determining authenticity of the posted URL link based on the provenance of the URL link indicating a registered member account associated with the membership ID and a registered network domain associated with the network ID.

In various embodiments, the Authenticity Platform 102 defines a relationship (such as a trust relationship) between a website domain, a first user account and a second user account. The website domain is not associated with, or operated by, the first user account, the second user account and the Authenticity Platform 102. The website domain may be operated by a third party. The first and second user accounts are user accounts for accessing the Authenticity Platform 102. The first user account, the second user account and the third-party operator of the website domain are respectively referred to as affiliates of each other due to participating in the relationship defined by the Authenticity Platform 102.

The Authenticity Platform 102 tracks web activity sourced from a first computing device associated with the first user account. For example, the first computing device may be operated by a first end user that corresponds with the first user account. The Authenticity Platform 102 detects the first user accessing a first website. The first website is not operated by the Authenticity Platform 102 or any of the affiliates participating in the relationship defined by the Authenticity Platform 102.

The first end user executes a publication action on the first website. For example, the first end user publishes digital media at the first website by posting a first URL on the first website. The Authenticity Platform 102 may receive data sent from the first computing indicative of a publication event. The data may identify the first URL. The first URL may be a digital media identifier generated by the Authenticity Platform 102. Various portions of the first URL may include one or more encodings identifying one or more of: the first user account, the relationship defined by the Authenticity Platform 102 for an Authentic Network(s) managed by the Authenticity Platform 102 and associated with the affiliates. The respective encodings are generated by the Authenticity Platform 102 and may be stored at the Authenticity Platform 102. In one embodiment, the first URL may include a first portion with a first encoding for the relationship and a second portion with a second encoding for the first user account. In another embodiment, the first URL may an encoding that represents both the first user account and the relationship. In another embodiment, the first URL may include an encoding that represents an Authentic Network of the affiliates. It is understood that one, a plurality and all the types of encodings herein described by may be included in the same URL.

After the publication event, the Authenticity Platform 102 similarly tracks web activity sourced from a second computing device associated with the second user account. For example, the second computing device may be operated by a second end user that corresponds with the second user account. The Authenticity Platform 102 detects the second user accessing the first website and selecting the first URL previously posted by the first end user. The Authenticity Platform 102 receives data sent from the second computing device indicating selection of the first URL.

The Authenticity Platform 102 accesses an instance of the first URL stored at a memory location managed and controlled by the Authenticity Platform 102. The Authenticity Platform 102 decodes one or more portions of the first URL, which returns identification of the first end user and a target website that resolves upon selection of the first URL. The returned identification of the first end confirms a first provenance related to the web activity of the second end user. The URL determines the target website belongs to an entity participating in the relationship between the affiliates on the Authentic Network. Based on the relationship determination, the Authenticity Platform 102 determines a second provenance related to the web activity of the second end user.

The Authenticity Platform 102 determines an extant of trust for the second end user's web activity (i.e. selection of the first URL on the first website external to the Authenticity Platform 102), based on determinations of the first and the second provenance related to the relationship between the affiliates on the Authentic Network.

Although an exemplary embodiment of at least one of a system, method, and non-transitory computer readable media has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

Figure 4:
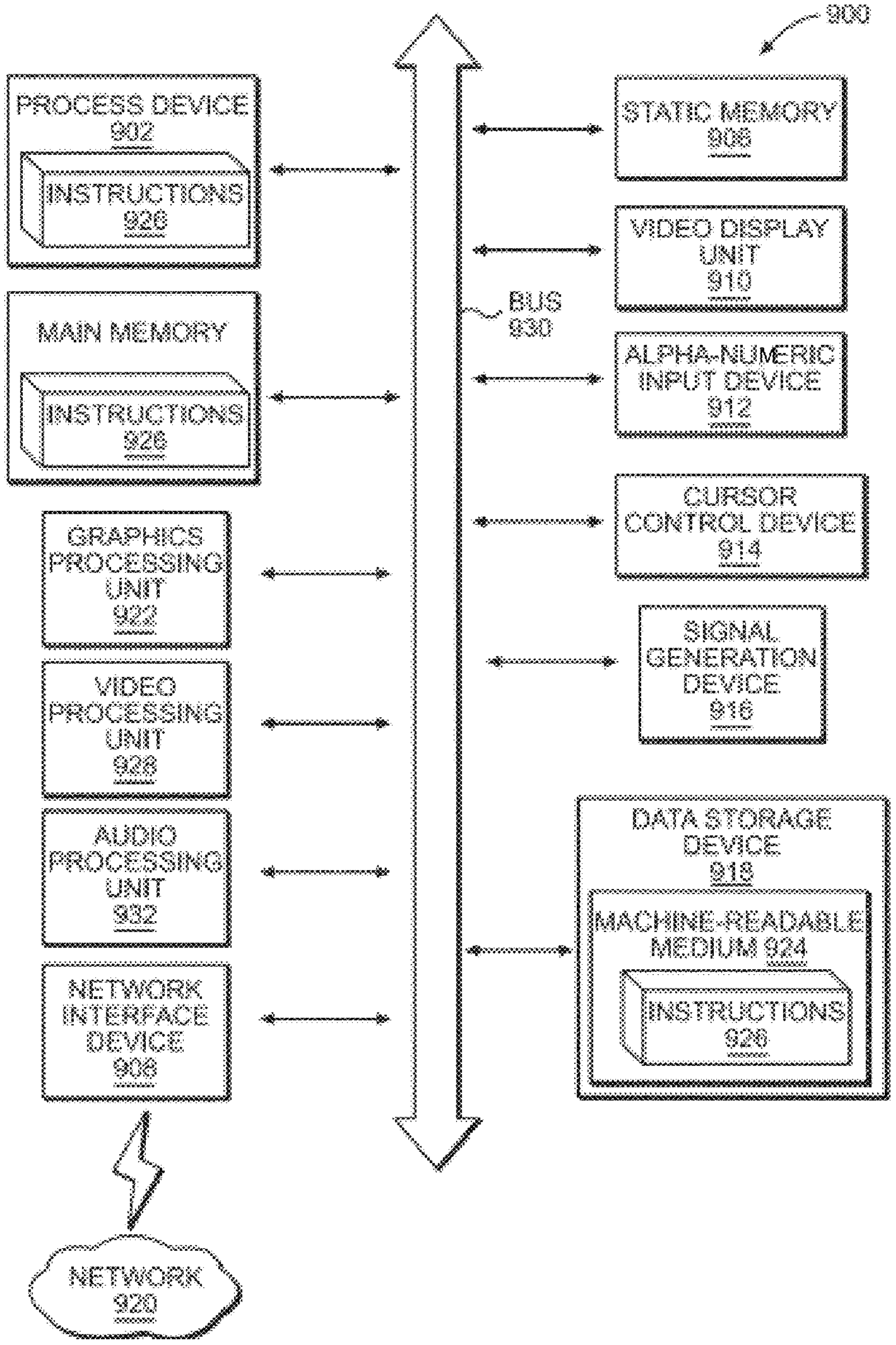
FIG. 4 illustrates an example computing platform used to perform one or more operations associated with example embodiments.

FIG. 4 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein.

The computer system 400 may further include a network interface device 408 to communicate over the network 420. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), a graphics processing unit 422, a signal generation device 416 (e.g., a speaker), graphics processing unit 422, video processing unit 428, and audio processing unit 432.

The data storage device 418 may include a machine-readable storage medium 424 (also known as a computer-readable medium) on which is stored one or more sets of instructions or software 426 embodying any one or more of the methodologies or functions described herein. The instructions 426 may also reside, completely or at least partially, within the main memory 404 and/or within the processing device 402 during execution thereof by the computer system 400, the main memory 404 and the processing device 402 also constituting machine-readable storage media.

In one implementation, the instructions 426 include instructions to implement functionality corresponding to the components of a device to perform the disclosure herein. While the machine-readable storage medium 424 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method comprising:

defining, by an authenticity software platform prior to an external web action, a trust relationship between a plurality of different affiliate entities participating in an authentic network managed by the authenticity software platform, wherein the authenticity software platform is configured to generate an anonymized membership identifier (AMID) for an affiliate entity;

receiving, by authenticity software platform, an indication of an external web action;

determining, by the authenticity software platform, a first provenance for a first external web location at which the web action occurs, wherein the first external web location includes the AMID and corresponds to a first affiliate entity of the plurality of different affiliate entities;

determining, by the authenticity software platform, a second provenance for an external result occurring in response to the web action, the external result comprising accessing a second external web location different from the first external web location and corresponding to a second affiliate entity of the plurality of different affiliate entities; and determining, by the authenticity software platform, an extant of trust based at least in part on the first and the second provenance for the result.

2. The computer-implemented method of claim 1, comprising:

determining, by the authenticity software platform, the web action comprises a selection of a digital media identifier previously generated by the authenticity software platform prior to the web action;

determining, by the authenticity software platform, a third provenance of publication of the digital media identifier at the first external web location; and wherein the extant of trust is further based in part on the third provenance.

3. The computer-implemented method of claim 2, wherein publication of the digital media identifier at the first external web location occurred prior to the web action.

4. The computer-implemented method of claim 1, further comprising:

wherein determining the first provenance for the external web location comprises: determining the first external web location corresponds to a first user account for accessing the authenticity software platform, the first user account participating in the trust relationship.

5. The computer-implemented method of claim 4, wherein defining the trust relationship occurs prior to the web action.

6. The computer-implemented method of claim 4, wherein determining the second provenance for the external result comprises:

determining a source of the external result corresponds to a second user account for accessing the authenticity software platform, the second user account participating in the trust relationship.

7. The computer-implemented method of claim 6, wherein the external result comprises accessing a second external web location provided by the second user account.

8. The computer-implemented method of claim 1, wherein determining the extant of trust occurs prior to accessing the second external web location of the external result due to the web action.

9. The computer-implemented method of claim 8, further comprising:

sending, by the authenticity software platform, a message data suitable for display at the first external web location, the message data communicates the extant of trust.

10. A system comprising one or more processors, and a non-transitory computer-readable medium including one or more sequences of instructions that, when executed by the one or more processors, cause the system to perform operations comprising:

defining, by an authenticity software platform prior to an external web action, a trust relationship between a plurality of different affiliate entities participating in an authentic network managed by the authenticity software platform, wherein the authenticity software platform is configured to generate an anonymized membership identifier for an affiliate entity (AMID);

receiving, by the authenticity software platform, an indication of an external web action;

determining, by the authenticity software platform, a first provenance for a first external web location at which the web action occurs, wherein the first external web location includes the AMID and corresponds to a first affiliate entity of the plurality of different affiliate entities;

determining, by the authenticity software platform, a second provenance for an external result occurring in response to the web action, the external result comprising accessing a second external web location different from the first external web location and corresponding to a second affiliate entity of the plurality of different affiliate entities; and determining, by the authenticity software platform, an extant of trust based at least in part on the first and the second provenance for the result.

11. The system of claim 10, comprising:

determining, by the authenticity software platform, the web action comprises a selection of a digital media identifier previously generated by the authenticity software platform prior to the web action;

determining, by the authenticity software platform, a third provenance of publication of the digital media identifier at the first external web location; and wherein the extant of trust is further based in part on the third provenance.

12. The system of claim 11, wherein publication of the digital media identifier at the first external web location occurred prior to the web action.

13. The system of claim 10, further comprising:

wherein determining the first provenance for the external web location comprises: determining the first external web location corresponds to a first user account for accessing the authenticity software platform, the first user account participating in the trust relationship.

14. The system of claim 13, wherein defining the trust relationship occurs prior to the web action.

15. The system of claim 13, wherein determining the second provenance for the external result comprises:

determining a source of the external result corresponds to a second user account for accessing the authenticity software platform, the second user account participating in the trust relationship.

16. The system of claim 15, wherein the external result comprises accessing a second external web location provided by the second user account.

17. The system of claim 10, wherein determining the extant of trust occurs prior to accessing the second external web location of the external result due to the web action.

18. The system of claim 17, further comprising:

sending, by the authenticity software platform, a message data suitable for display at the first external web location, the message data communicates the extant of trust.

19. A computer program product comprising a non-transitory computer-readable medium having a computer-readable program code embodied therein to be executed by one or more processors, the program code including instructions for:

defining, by an authenticity software platform prior to an external web action, a trust relationship between a plurality of different affiliate entities participating in an authentic network managed by the authenticity software platform, wherein the authenticity software platform is configured to generate an anonymized membership identifier for an affiliate entity (AMID);

receiving, by the authenticity software platform, an indication of an external web action;

determining, by the authenticity software platform, a first provenance for a first external web location at which the web action occurs, wherein the first external web location includes the AMID and corresponds to a first affiliate entity of the plurality of different affiliate entities;

determining, by the authenticity software platform, a second provenance for an external result occurring in response to the web action, the external result comprising accessing a second external web location different from the first external web location and corresponding to a second affiliate entity of the plurality of different affiliate entities; and determining, by the authenticity software platform, an extant of trust based at least in part on the first and the second provenance for the result.

* * * * *